United States Patent
Stringhini et al.

(10) Patent No.: US 9,756,007 B1
(45) Date of Patent: Sep. 5, 2017

(54) SYSTEMS AND METHODS FOR DETECTING COMPROMISED MESSAGING ACCOUNTS

(71) Applicant: Symantec Corporation, Mountain View, CA (US)

(72) Inventors: Gianluca Stringhini, Goleta, CA (US); Olivier Thonnard, Grasse (FR)

(73) Assignee: Symantec Corporation, Mountain View, CA (US)

(*) Notice: Subject to any disclaimer, the term of this patent is extended or adjusted under 35 U.S.C. 154(b) by 201 days.

(21) Appl. No.: 14/133,567

(22) Filed: Dec. 18, 2013

(51) Int. Cl.
  *G06F 15/16* (2006.01)
  *H04L 12/58* (2006.01)

(52) U.S. Cl.
  CPC .................. *H04L 51/30* (2013.01)

(58) Field of Classification Search
  CPC ....................................... H04L 67/22
  USPC ........................................... 709/203
  See application file for complete search history.

(56) References Cited

U.S. PATENT DOCUMENTS

| | | | | |
|---|---|---|---|---|
| 2006/0168024 A1* | 7/2006 | Mehr | .................. | H04L 12/585 709/206 |
| 2006/0277259 A1* | 12/2006 | Murphy | .................. | H04L 51/12 709/206 |
| 2008/0271143 A1* | 10/2008 | Stephens | ............. | H04L 41/5061 726/22 |
| 2011/0258049 A1* | 10/2011 | Ramer | .............. | G06F 17/30867 705/14.66 |
| 2013/0275441 A1* | 10/2013 | Agrawal | ........... | G06F 17/30616 707/749 |
| 2014/0310346 A1* | 10/2014 | Deng | ..................... | H04L 67/22 709/204 |

OTHER PUBLICATIONS

Egele, Manuel et al., "COMPA: Detecting Compromised Accounts on Social Networks", 20th Annual Network & Distributed System Security Symposium Feb. 24-27, 2013; Internet Society, (Dec. 2012).

(Continued)

*Primary Examiner* — Joseph Greene
(74) *Attorney, Agent, or Firm* — FisherBroyles LLP

(57) ABSTRACT

A computer-implemented method for detecting compromised messaging accounts may include maintaining a behavior database that associates a plurality of messaging accounts with messaging behaviors that typify each of the messaging accounts. The method may also include detecting an attempt by a user to send a message from a messaging account. In addition, the method may include determining that the messaging account has potentially been compromised by comparing features of the message with messaging behaviors associated with the messaging account in the behavior database. Finally, the method may include verifying that the user is an owner of the messaging account in response to the determination that the messaging account has potentially been compromised. Various other methods, systems, and computer-readable media are also disclosed.

20 Claims, 7 Drawing Sheets

(56) References Cited

OTHER PUBLICATIONS

Lin, Eric et al., "Lightweight Client-side Methods for Detecting Email Forgery", Information Security Applications, 13th International Workshop, WISA 2012, Jeju Island, Korea, Aug. 16-18, 2012, Revised Selected Papers; Lecture Notes in Computer Science vol. 7690; Springer Berlin Heidelberg, (2012), 254-269.

Stolfo, Salvatore J., et al., "Behavior Profiling of Email", https://academiccommons.columbia.edu/download/fedora_content/download/ac: 125721/CONTENT/nsf-nij-emt.pdf, as accessed Oct. 18, 2013, (2003).

* cited by examiner

SYSTEMS AND METHODS FOR DETECTING COMPROMISED MESSAGING ACCOUNTS

BACKGROUND

Distributors of spam, phishing attacks, and malware have traditionally dispersed unsolicited and potentially harmful messages through self-created email accounts. While attackers may create these accounts to appear legitimate, messages that originate from unfamiliar accounts may be more easily identified as suspicious by potential victims. As such, some attackers aim to increase the success of their attacks by hijacking the private accounts of other email users through exploiting security weaknesses (e.g., social engineering, intercepting communications, etc.). Once attackers have access to a private account, they may distribute convincing attacks from email addresses familiar to their victims.

Many traditional techniques of detecting spam and malware rely on identifying illegitimate email sources once they have been distributed to a recipient. For example, some anti-spam systems quarantine or block email originating from unfamiliar or unapproved sources. In addition, some techniques verify the origin of an email by analyzing cryptographic signatures contained within the messages. However, these techniques may not be effective against attackers that have gained access to a legitimate account. As such, the instant disclosure identifies a need for additional and improved systems and methods for detecting compromised messaging accounts.

SUMMARY

As will be described in greater detail below, the instant disclosure generally relates to systems and methods for detecting compromised messaging accounts by comparing the features of unsent messages originating from a messaging account with expected messaging features associated with the messaging account. In one example, a computer-implemented method for accomplishing such a task may include maintaining a behavior database that associates a plurality of messaging accounts with messaging behaviors that typify each of the messaging accounts by (1) extracting messaging features from messages sent by each of the messaging accounts, (2) identifying messaging behaviors that typify each messaging account by comparing the messaging features extracted from messages sent by each of the messaging accounts, and (3) associating each of the messaging accounts with the messaging behaviors that typify each messaging account. The method may also include detecting an attempt by a user to send a message from a messaging account. In addition, the method may include determining that the messaging account has potentially been compromised by comparing features of the message with messaging behaviors associated with the messaging account in the behavior database. Finally, the method may include verifying that the user is an owner of the messaging account in response to the determination that the messaging account has potentially been compromised.

In some examples, the messaging behaviors that typify each messaging account may include writing habits that characterize a writing style of an account owner, composition habits that characterize non-stylistic compositional behaviors of an account owner, and/or interaction habits that characterize an interpersonal communication network of an account owner. In these examples, the writing habits may include a frequency with which certain characters and/or certain words appear in messages sent by the account owner, as well as grammatical and/or stylistic features that appear in messages sent by the account owner. The composition habits may include times of day and/or days of the week the account owner sends messages, web addresses included in messages sent by the account owner, and/or formatting features included in messages sent by the account owner. Furthermore, the interaction habits may include recipients and/or the domains of messaging accounts of the recipients of messages sent by the account owner.

In some embodiments, detecting the attempt by the user to send the message from the messaging account may include intercepting the message before it is distributed to an intended recipient. In some examples, determining that the messaging account has potentially been compromised may include comparing the features of the message with the messaging behaviors associated with the messaging account to determine that at least one of the features of the message does not match the messaging behaviors associated with the messaging account.

In some embodiments, verifying that the user is the account owner may include requiring the user to provide an answer to a CAPTCHA, an answer to a security question previously chosen by the account owner, and/or an alpha-numeric code sent to a mobile communication device linked to the account owner. These embodiments may further include determining whether the user has been successfully verified.

In some examples, the embodiments may include determining that the user has been successfully verified. In these examples, the computer-implemented method may include determining that the messaging account has not been compromised in response to the determination that the user has been successfully verified. The method may also include updating the behavior database with the features of the message in response to the determination that the messaging account has not been compromised.

Some embodiments of the instant disclosure may include determining that the user has not been successfully verified. Such embodiments may include determining that the messaging account has been compromised in response to the determination that the user has not been successfully verified. These embodiments may also include preventing the user from accessing the messaging account in response to the determination that the messaging account has been compromised. Finally, as will be descried in greater detail below, the computer-implemented method may be performed by one or more client-side computing devices and/or a server-side computing device.

In one embodiment, a system for implementing the above-described method may include a maintenance module that maintains a behavior database that associates a plurality of messaging accounts with messaging behaviors that typify each of the messaging accounts by (1) extracting messaging features from messages sent by each of the messaging accounts, (2) identifying messaging behaviors that typify each messaging account by comparing the messaging features extracted from messages sent by each of the messaging accounts, and (3) associating each of the messaging accounts with the messaging behaviors that typify each messaging account. The system may also include a detection module that detects an attempt by a user to send a message from a messaging account. In addition, the method may include a determination module that determines that the messaging account has potentially been compromised by comparing features of the message with messaging behaviors associated with the messaging account in the behavior database. Finally, the system may include a verification module that verifies that the user is an owner of the messaging account in response to the determination that the messaging account has potentially been compromised.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to maintain a behavior database that associates a plurality of messaging accounts with messaging behaviors that typify each of the messaging accounts by (1) extracting messaging features from messages sent by each of the messaging accounts, (2) identifying messaging behaviors that typify each messaging account by comparing the messaging features extracted from messages sent by each of the messaging accounts, and (3) associating each of the messaging accounts with the messaging behaviors that typify each messaging account. The computer-executable instructions may also cause the computing device to detect an attempt by a user to send a message from a messaging account. In addition, computer-executable instructions may cause the computing device to determine that the messaging account has potentially been compromised by comparing features of the message with messaging behaviors associated with the messaging account in the behavior database. Finally, the computer-executable instructions may cause the computing device to verify that the user is an owner of the messaging account in response to the determination that the messaging account has potentially been compromised.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
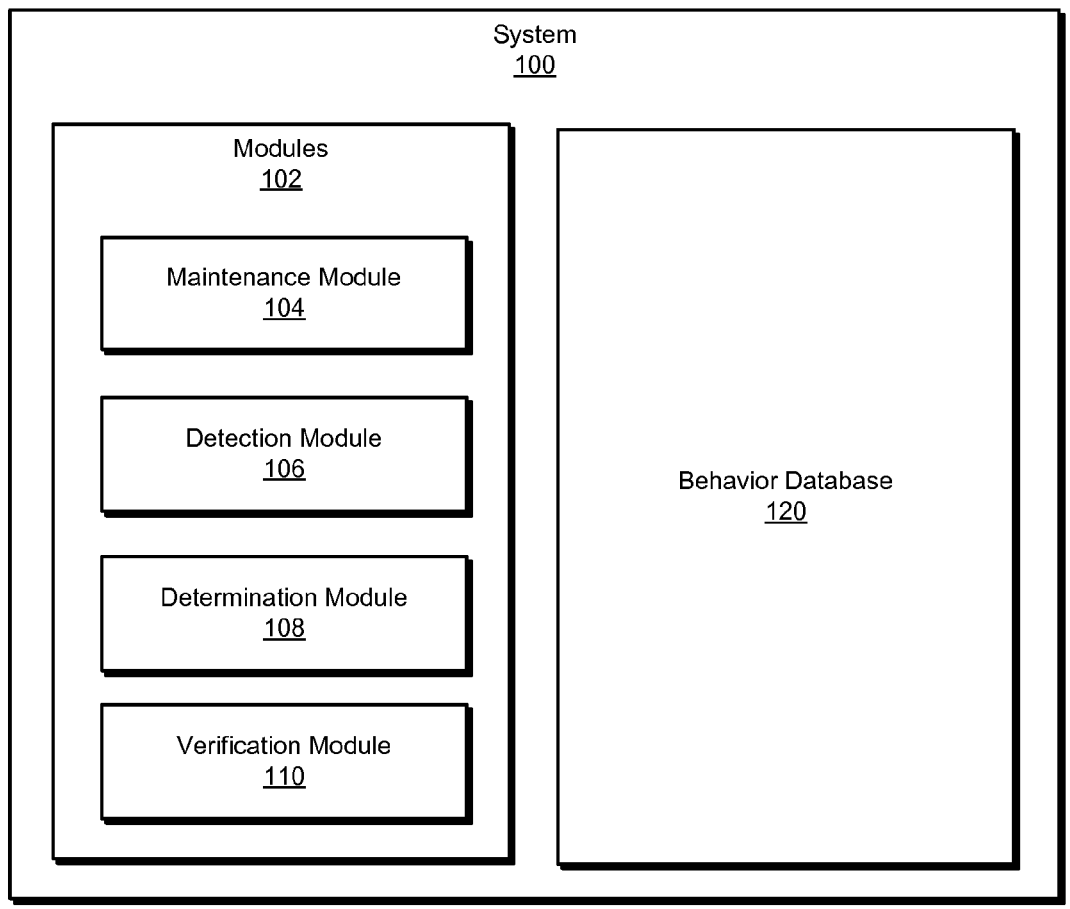
FIG. 1 is a block diagram of an exemplary system for detecting compromised messaging accounts.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting compromised messaging accounts. As will be explained in greater detail below, by comparing the features of an unsent message from a messaging account against a database of expected message features, the systems and methods disclosed herein may detect attempts to distribute spam and malware via compromised accounts before the messages are sent. Furthermore, by comparing messaging features extracted from multiple messaging accounts, the systems and methods disclosed herein may more accurately form behavior profiles associated with each messaging account and may therefore more correctly identify compromised messaging accounts.

Figure 2:
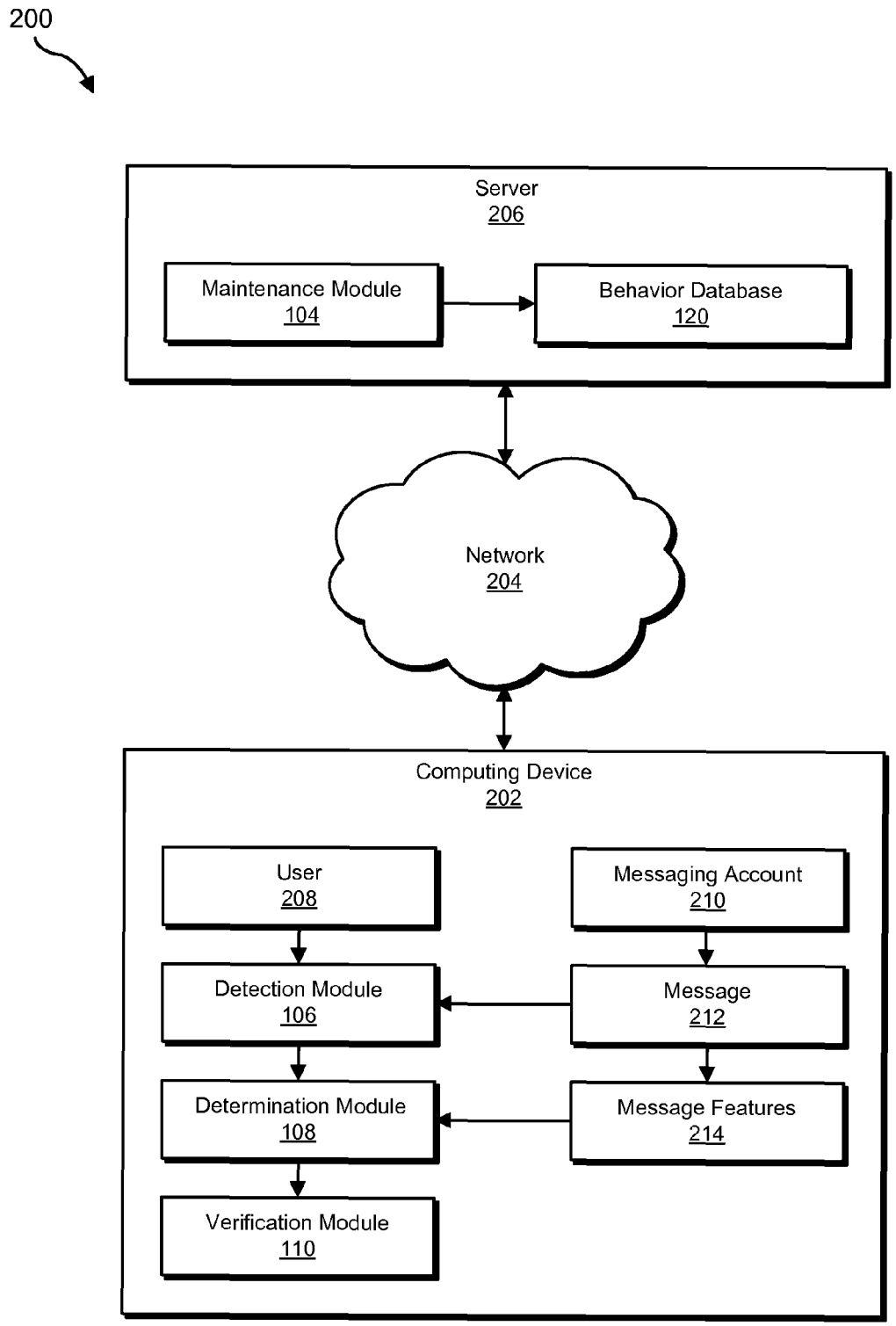
FIG. 2 is a block diagram of an additional exemplary system for detecting compromised messaging accounts.

The following will provide, with reference to FIGS. 1-2, detailed descriptions of exemplary systems for detecting compromised messaging accounts. Detailed descriptions of corresponding computer-implemented methods will also be provided in connection with FIG. 3. Detailed descriptions of exemplary message features extracted from messages will be provided in connection with FIG. 4. Detailed descriptions of exemplary behavior databases will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting compromised messaging accounts. As illustrated in this figure, exemplary system 100 may include one or more modules 102 for performing one or more tasks. For example, and as will be explained in greater detail below, exemplary system 100 may include a maintenance module 104 that maintains a behavior database that associates a plurality of messaging accounts with messaging behaviors that typify each of the messaging accounts by (1) extracting messaging features from messages sent by each of the messaging accounts, (2) identifying messaging behaviors that typify each messaging account by comparing the messaging features extracted from messages sent by each of the messaging accounts, and (3) associating each of the messaging accounts with the messaging behaviors that typify each messaging account.

In addition, and as will be described in greater detail below, exemplary system 100 may also include detection module 106 that detects an attempt by a user to send a message from a messaging account. Exemplary system 100 may further include a determination module 108 that determines that the messaging account has potentially been compromised by comparing features of the message with messaging behaviors associated with the messaging account in the behavior database. Finally, exemplary system 100 may include a verification module 110 that verifies that the user is an owner of the messaging account in response to the determination that the messaging account has potentially been compromised. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as behavior database 120. As will be described in greater detail below, behavior database 120 may be configured to store associations between messaging accounts and messaging behaviors that typify each messaging account.

Behavior database 120 may represent portions of a single database or computing device or a plurality of databases or computing devices. For example, behavior database 120 may represent a portion of server 206 in FIG. 2, computing system 610 in FIG. 6, and/or portions of exemplary network architecture 700 in FIG. 7. Alternatively, behavior database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in behavior database 120. Additionally or alternatively, server 206 may be programmed with one or more of modules 102 and/or may store all or a portion of the data in behavior database 120.

In one embodiment, one or more of modules 102 from FIG. 1 may, when executed by at least one processor of computing device 202 and/or server 206, enable computing device 202 and/or server 206 to detect compromised messaging accounts. For example, and as will be described in greater detail below, maintenance module 104 may cause computing device 202 and/or server 206 to maintain behavior database 120. Detection module 106 may cause computing device 202 to detect an attempt by a user (e.g., user 208) to send a message (e.g., message 212) from a messaging account (e.g., messaging account 210). Determination module 108 may then determine that messaging account 210 has potentially been compromised by comparing features (e.g., message features 214) of message 212 with messaging behaviors associated with messaging account 210 in behavior database 120. Finally, verification module 110 may verify that user 208 is an owner of messaging account 210 in response to the determination that messaging account 210 has potentially been compromised.

The phrase "messaging account," as used herein, generally refers to any account linked to one or more owners that is used to distribute electronic messages. Examples of messaging accounts include email accounts, text messaging services, instant messaging accounts, and the like. Accordingly, the phrase "compromised messaging account," as used herein, generally refers to any messaging account that has been accessed illegitimately by an unauthorized user. For example, a messaging account may become compromised when a person or entity other than the account owner gains access to a password used to access the messaging account and subsequently attempts to distribute messages from the messaging account.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing, analyzing, and/or providing information relating to messaging accounts and their associated messaging behaviors. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
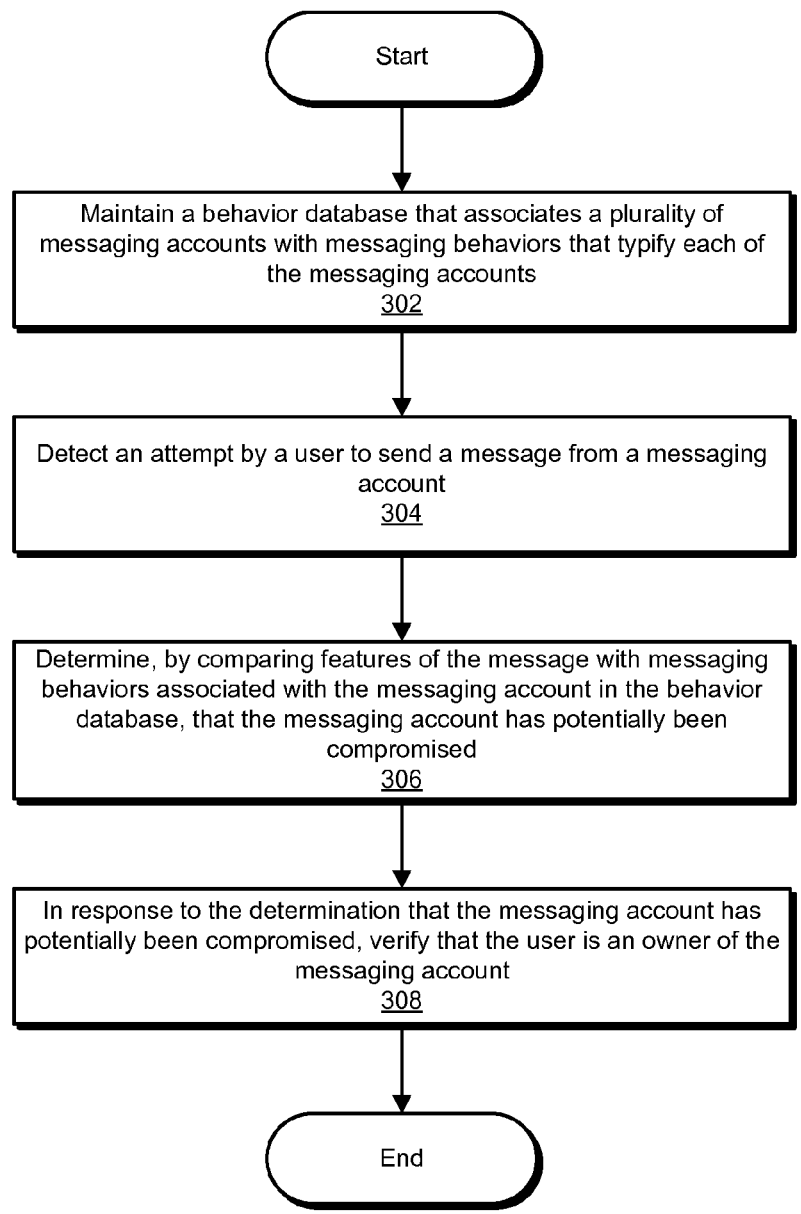
FIG. 3 is a flow diagram of an exemplary method for detecting compromised messaging accounts.

FIG. 3 is a flow diagram of an exemplary computer-implemented method 300 for detecting compromised messaging accounts. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may maintain a behavior database that associates a plurality of messaging accounts with messaging behaviors that typify each of the messaging accounts. For example, maintenance module 104 may, as part of server 206 in FIG. 2, maintain behavior database 120.

The systems described herein may perform step 302 in a variety of ways. In some examples, maintenance module 104 may first extract messaging features from messages sent by each of the messaging accounts. The phrase "messaging features," as used herein, generally refers to any traits, attributes, or characteristics that may be included in a message. For example, messaging features may describe the style and/or subject matter of a message, they may include formatting or grammatical features included in a message, and/or they may encompass any other characterization of the content of a message.

Maintenance module 104 may extract messaging features from messages sent by messaging accounts in a variety of ways. For example, maintenance module 104 may extract messaging features from a single message sent by a messaging account, or maintenance module 104 may extract messaging features from multiple messages sent by the messaging account. Maintenance module 104 may also extract messaging features from a list of recipients of a message, a subject line of a message, a body of a message, a signature of a message, and/or previously sent messages in a message chain. To identify specific messaging features within a message, maintenance module 104 may search for pre-determined keywords, grammatical features, stylistic and non-stylistic features, formatting features, and any other applicable features. Maintenance module 104 may also analyze the overall content of a message for information relating to the subject matter and/or writing style of a message.

Once maintenance module 104 has extracted messaging features for each of the messaging accounts, maintenance module 104 may identify messaging behaviors that typify each messaging account by comparing the extracted messaging features. As used herein, the phrase "messaging behaviors" generally refers to trends of certain messaging features appearing in multiple messages sent from a messaging account. In some examples, messaging behaviors that typify a messaging account may appear more frequently in messages sent from that particular messaging account than in messages sent from other messaging accounts.

While the messaging accounts need not be related to one another, in some examples the messaging accounts may belong to the same organization (e.g., a business or school). In these examples, maintenance module 104 may compare features extracted from each of the messaging accounts within the organization.

In some embodiments, maintenance module 104 may determine that some messaging features appear in most or all of the messaging accounts, and/or that some messaging features only appear in one or a few messaging accounts. For example, maintenance module 104 may determine that most of the messaging accounts send messages predominantly between 9:00 AM and 6:00 PM, Monday through Friday. Therefore, maintenance module 104 may determine that those days and times do not typify the messaging behavior of a messaging account because they characterize the behavior of multiple messaging accounts. On the other hand, maintenance module 104 may determine that only three messaging accounts include signatures in the messages sent from those messaging accounts. Therefore, maintenance module 104 may determine that "including a signature" is a messaging behavior that typifies those three messaging accounts.

In some embodiments, maintenance module 104 may assign a weight to each of the messaging behaviors based on a frequency with which the messaging behaviors appear in each messaging account. Continuing the example from above, maintenance module 104 may determine that of the three messaging accounts that include signatures in messages, two messaging accounts include signatures 100% of the time and one messaging account includes a signature 85% of the time. Therefore, maintenance module 104 may assign a higher weight to "including a signature" to the first two messaging accounts (e.g., a weight of "1") and a lower weight to the third messaging account (e.g., a weight of "0.85").

The messaging behaviors that typify each messaging account may include a variety of patterns and traits that characterize messaging habits of each account user. In some examples, the messaging behaviors may include writing habits that characterize a writing style of an account owner. These writing habits may include a frequency with which certain characters (e.g., punctuation, capital letters, numbers) appear in messages sent by the account owner. The writing habits may also include a frequency with which certain functional words (e.g., "when," "is," and "for"), certain special words (e.g., full names, dates, and acronyms), and/or context-specific words (e.g., technical, financial, and other industry-related words) appear in messages sent by the account owner. Writing habits may further include generic style characteristics included in messages sent by the account owner, such as types of bullets used, comma placement, the number of spaces following periods, and/or any other punctuation-related features. In addition, writing habits may include style metrics that characterize the overall style of a message, such as the number of paragraphs in a message and/or the complexity of language used in messages sent by the account owner.

In some embodiments, the messaging behaviors may also include composition habits that characterize non-stylistic compositional behaviors of an account owner. The composition habits may include times of day (e.g., 9:00 AM-6:00 PM) the account owner sends messages, days of the week (e.g., Monday-Friday) the account owner sends messages, web addresses and/or domains or web addresses included in messages, as well as formatting features (e.g., signatures) included in messages sent by the account owner.

Additionally or alternatively, the extracted messaging features may include interaction habits that characterize an interpersonal communication network of an account owner. The interaction habits may include recipients (e.g., colleagues, co-workers, friends, and family members) of messages sent by the account owner and/or domains of messaging accounts (e.g., public email services and company-specific email services) of recipients of messages sent by the account owner.

In some examples, extracting messaging features and/or identifying messaging behaviors may be performed by automated learning mechanisms. For example, Support Vector Machines (SVMs) may be trained with machine learning algorithms, such as Sequential Minimal Optimization (SMO), such that behavior database 120 may be created and maintained with limited involvement from human operators.

By identifying messaging behaviors that typify a messaging account based on the behavior of multiple messaging accounts, rather than solely on the behavior of a single messaging account, the systems and methods described herein may more accurately and comprehensively define distinctive messaging behaviors that characterize each messaging account. As such, the disclosed systems and methods may more effectively detect behavior that is not typical of a messaging account and therefore that the account may have been compromised.

Once maintenance module 104 has identified messaging behaviors that typify each messaging account, maintenance module 104 may then associate each of the messaging accounts with their typifying messaging behaviors in behavior database 120. For example, maintenance module 104 may store any link, connection, or relationship between a messaging account and a list of messaging behaviors and their associated weights in computing device 202 and/or server 206.

Returning to FIG. 3, at step 304, the systems described herein may detect an attempt by a user to send a message from a messaging account. For example, detection module 106 may, as part of computing device 202 in FIG. 2, detect an attempt by user 208 to send message 212 from messaging account 210.

The systems described herein may perform step 304 in a variety of ways. In some examples, detection module 106 may intercept message 212 before it is distributed to an intended recipient. For example, detection module 106 may detect the attempt by user 208 to send message 212 while user 208 is composing message 212 (i.e., entering text into messaging account 210). In addition, detection module 106 may detect that user 208 is attempting to send message 212 by re-routing and holding message 212 for analysis after user 208 has attempted to distribute message 212. By intercepting and analyzing a message before it is distributed, the systems and methods described herein may reduce the risk of a recipient receiving and opening messages containing spam and/or malware.

Returning to FIG. 3, at step 306, the systems described herein may determine that the messaging account has potentially been compromised by comparing features of the message with messaging behaviors associated with the messaging account in the behavior database. For example, determination module 108 may, as part of computing device 202 in FIG. 2, determine that messaging account 210 has potentially been compromised by comparing message features 214 with messaging behaviors associated with messaging account 210 in behavior database 120.

The systems described herein may perform step 306 in a variety of ways. In some examples, determination module 108 may determine that at least one of message features 214 does not match the messaging behaviors associated with messaging account 210. Additionally or alternatively, determination module 108 may determine that messaging account 210 has potentially been compromised by determining that a percentage and/or number of message features 214 that do not match the messaging behaviors associated with messaging account 210 is above a threshold. In some embodiments, the threshold may be a static threshold (e.g., 30% or 5 features). In other embodiments, the threshold may be based on the nature of the extracted features. For example, determination module 108 may determine that messaging account 210 has potentially been compromised if the most highly-weighted feature or a certain combination of features of message 212 does not match the expected messaging behaviors stored in behavior database 120.

Figure 4:
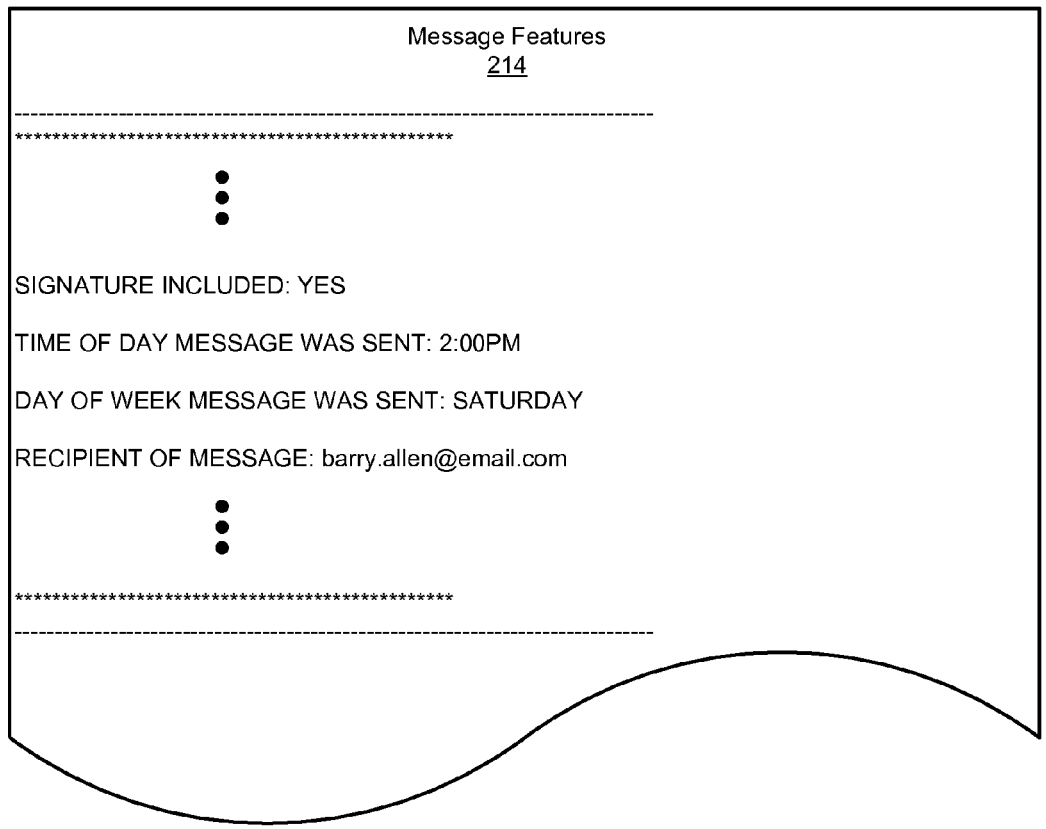
FIG. 4 is an illustration of exemplary features extracted from a message.
Figure 5:
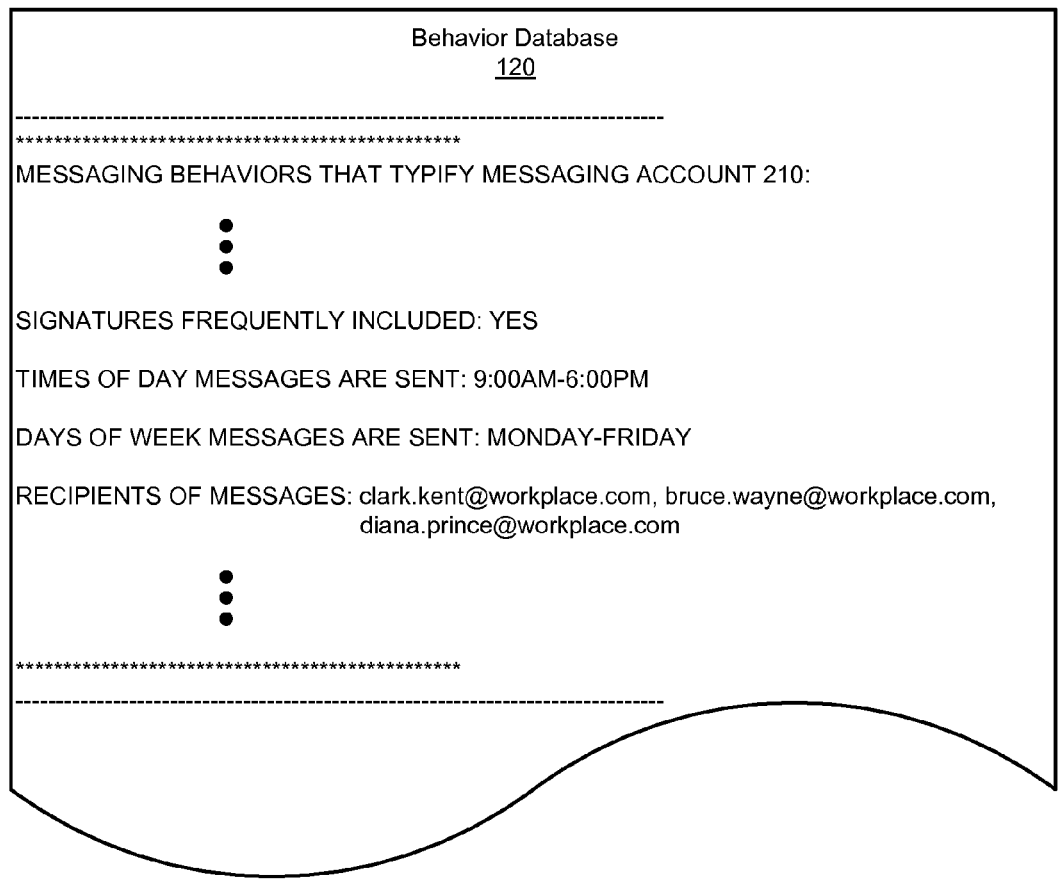
FIG. 5 is an illustration of an exemplary behavior database.

As an example, FIG. 4 is an illustration of exemplary message features 214 extracted from message 212. FIG. 5 is an illustration of exemplary messaging behaviors that typify messaging account 210. When determining whether messaging account 210 has potentially been compromised, determination module 108 may determine, from message features 214 in FIG. 4, that a signature was included in message 212. Determination module 108 may also determine that signatures are frequently included in messages sent by messaging account 210 from behavior database 120 in FIG. 5. Similarly, determination module 108 may determine from message features 214 that the time at which message 212 was sent (2:00 PM) falls into the time range (9:00 AM-6:00 PM) that behavior database 120 reports messaging account 210 as typically sending messages. Based on these determinations, determination module 108 may conclude that there is no evidence to suggest messaging account 210 has potentially been compromised.

However, determination module 108 may determine from message features 214 that message 212 was sent on a Saturday. Determination module 108 may determine from behavior database 120 that Saturday is not a day messaging account 210 typically sends messages. Therefore, determination module 108 may determine that messaging account 210 has potentially been compromised. Additionally or alternatively, determination module 108 may determine that the recipient of message 212 (i.e., "barry.allen@email.com") is not a known recipient of messages sent from messaging account 210 and furthermore that the domain of the recipient of message 212 (i.e., "email. com") does not match the domain of known recipients (i.e., "workplace.com"). Based on this discrepancy, or any combination of discrepancies found between message features 214 and messaging behaviors that typify messaging account 210 in behavior database 120, determination module 108 may determine that messaging account 210 has potentially been compromised.

Returning to FIG. 3, at step 308 the systems described herein may verify that the user is an owner of the messaging account in response to the determination that the messaging account has potentially been compromised. For example, verification module 110 may verify that user 208 is an owner of messaging account 210 in response to the determination that messaging account 210 has potentially been compromised.

The systems described herein may perform step 308 in a variety of ways. For example, verification module 110 may verify that user 208 is the account owner by requiring user 208 to provide an answer to a CAPTCHA to verify that user 208 is not a computer-automated program that has gained access to messaging account 210. Verification module 110 may also require user 208 to provide an answer to a security question previously chosen by the account owner, an alphanumeric code sent to a mobile communication device linked to the account owner, or any other verification task that requires knowledge only the owner of messaging account 210 should be able to provide. Once user 208 has provided the required information, verification module 110 may determine whether user 208 has been successfully verified.

In some examples, verification module 110 may determine that user 208 has been successfully verified (e.g., user 208 provided the correct information or completed the verification task). In response to the determination that user 208 has been successfully verified, verification module 110 may determine that messaging account 210 has not been compromised. Upon determining that messaging account 210 has not been compromised, verification module 110 may direct computing device 202 to proceed with distributing message 212 to its intended recipients. In addition, verification module 110 may direct maintenance module 104 to update behavior database 120 with message features extracted from message 212. As such, the systems described herein may dynamically update the messaging-behavior profile of messaging account 210 as the account owner changes his/her messaging behaviors.

In contrast, verification module 110 may determine that user 208 has not been successfully verified (e.g., user 208 failed to provide the correct information, provided incorrect information, or otherwise failed to complete the verification task). In response to the determination that user 208 has not been successfully verified, verification module 110 may determine that messaging account 210 has been compromised. Upon determining that messaging account 210 has been compromised, verification module 110 may prevent user 208 from accessing messaging account 210. For example, verification module 110 may prevent message 212 from being distributed to its intended recipients, prevent user 208 from distributing additional messages, prohibit activity on messaging account 210 until the identity of user 208 has been successfully verified, or any other suitable manner to prevent an attacker from accessing a compromised account. Additionally or alternatively, verification module 110 may alert the owner of messaging account 210 that messaging account 210 has been compromised. For example, verification module 110 may send a notification that messaging account 210 has been compromised to a mobile communication device or additional messaging account linked to the account owner.

In some examples, the systems described herein may be implemented on a combination of client-side and server-side computing devices. For example, a client-side computing device, such as computing device 202, may extract messaging features from messages distributed from that computing device. Server-side computing devices, such as server 206, may receive extracted messaging features from multiple client-side computing devices, compile messaging behaviors that typify each messaging account, and store the associations between each messaging account and their typifying messaging behaviors. Additionally, when computing device 202 detects an attempt to send a message from computing device 202, server 206 may determine whether the message complies with the messaging behaviors stored in server 206. If server 206 determines that the message does not comply with the messaging behaviors and therefore that the messaging account from which is originated has potentially been compromised, server 206 may send a verification procedure to computing device 202.

Extracting messaging features is generally the most resource-intensive component of maintaining behavior profiles and detecting compromised messaging accounts. Allocating that task to individual computing devices may free up resources on server-side devices so that they may monitor a greater number of messaging accounts. Furthermore, by separating the computing device from which the messaging account sends messages and the computing device that stores messaging behaviors, attackers who have compromised a messaging account may be prevented from accessing and tampering with the behavior profiles and/or verification procedures stored on the server.

The systems and methods disclosed herein may be implemented in a variety of ways and provide a number of advantages. For example, by detecting compromised messaging accounts, the systems and methods described herein may prevent attackers who have gained access to a messaging account from distributing spam, malware, spearphishing attacks, and other potentially harmful messages. In particular, the disclosed systems and methods may identify security threats that may have otherwise gone undetected by systems based on analyzing the origin of messages. Furthermore, by compiling messaging-behavior profiles based on an analysis of multiple messaging accounts, embodiments of the instant application may enable more precise characterization of a user's messaging behavior and therefore more accurate detection of unexpected behavior.

Figure 6:
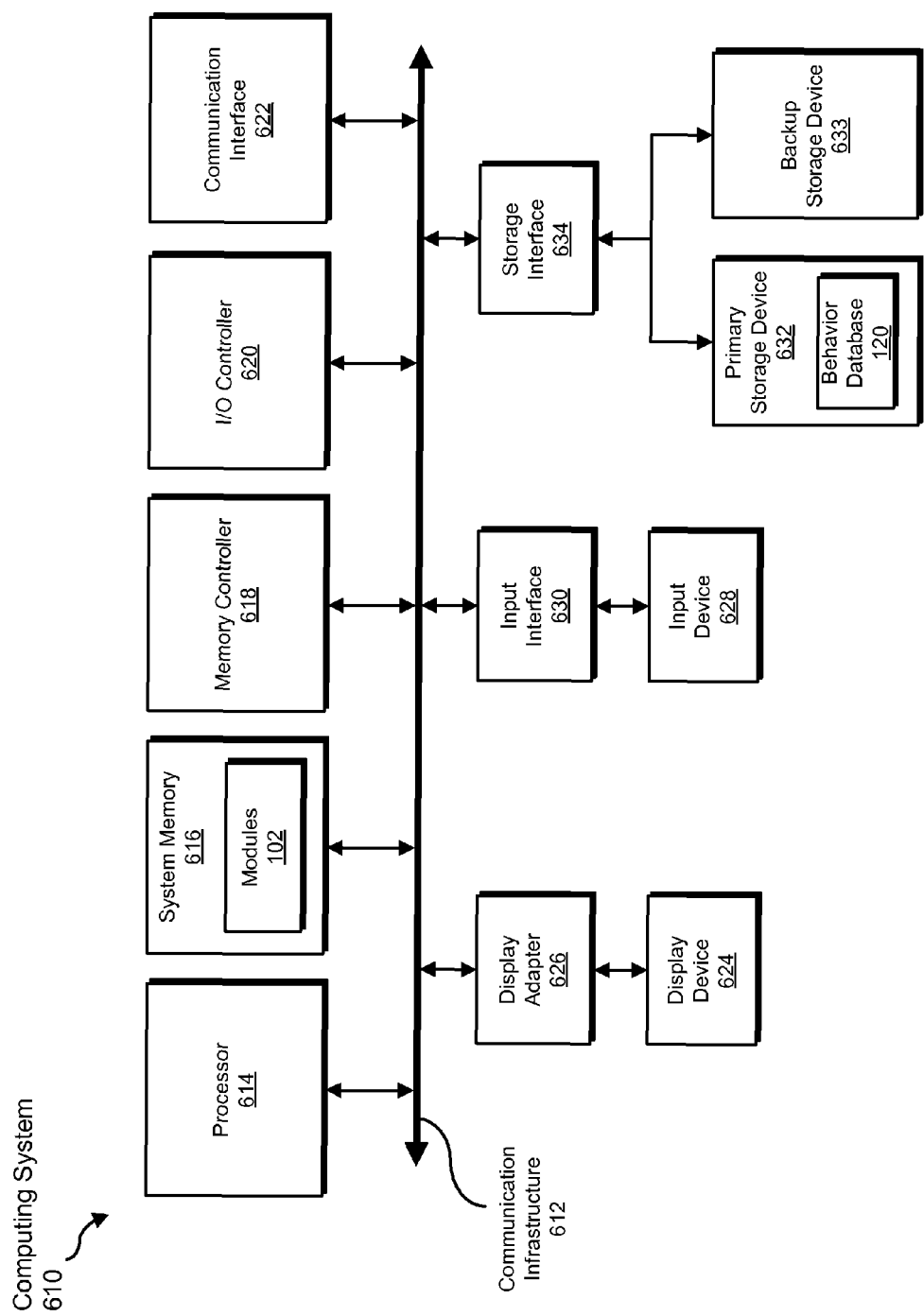
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, behavior database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
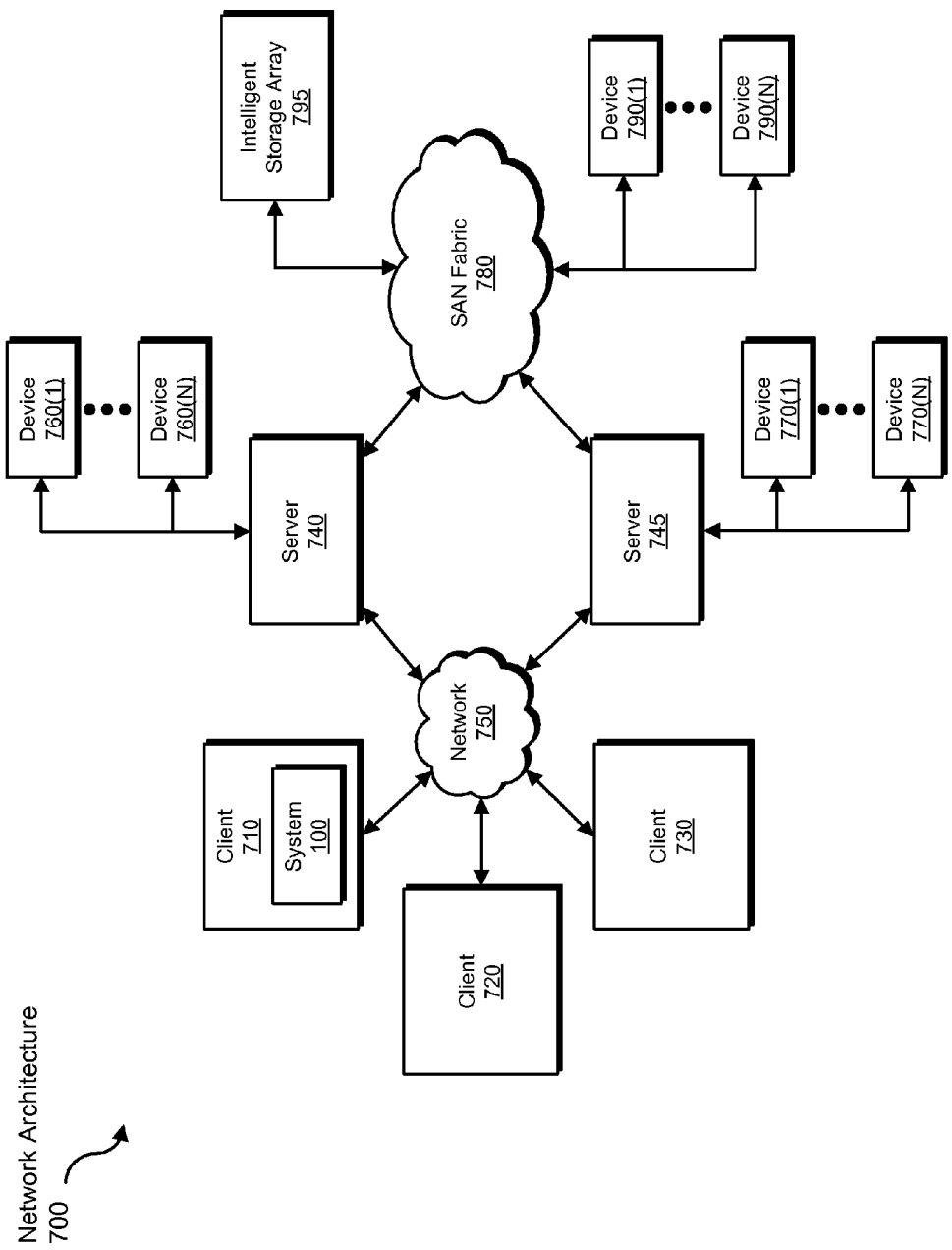
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting compromised messaging accounts.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all ora portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive messages distributed from messaging accounts, transform information included within the messages, store the result of the transformation in a messaging behavior database, and use the result of the transformation to detect compromised messaging accounts. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting compromised messaging accounts, at least a portion of the method being performed by a computing device comprising at least one processor, the method comprising:
   maintaining a behavior database that associates messaging accounts of a plurality of users with messaging behaviors that typify each messaging account by:
      extracting, from each of the messaging accounts, messaging features that describe stylistic and compositional traits of messages sent by the messaging accounts;
      for each messaging account, identifying, based on the extracted messaging features, messaging behaviors that typify the messaging account by:
         determining a frequency with which the messaging account displays at least one messaging behavior;
         determining that the frequency with which the messaging account displays the messaging behavior exceeds a frequency with which at least one other messaging account displays the messaging behavior; and
         weighting the messaging behavior based on a comparison between the frequency with which the messaging account displays the messaging behavior and the frequency with which the other messaging account displays the messaging behavior;
      identifying, based on the extracted messaging features, messaging behaviors that do not typify any of the messaging accounts of the plurality of users by identifying messaging behaviors that are displayed with a similar frequency by at least most of the messaging accounts of the plurality of users; and associating, in the behavior database, each of the messaging accounts of the plurality of users with the weighted messaging behaviors that typify each messaging account and not the messaging behaviors that do not typify any of the messaging accounts of the plurality of users;

detecting an attempt by a user to send a message from one of the messaging accounts of the plurality of users;

determining, by comparing features of the message with the weighted messaging behaviors associated with the messaging account in the behavior database, that the messaging account has potentially been compromised; and in response to the determination that the messaging account has potentially been compromised, verifying that the user is an owner of the messaging account.

2. The method of claim 1, wherein the messaging behaviors that typify each messaging account comprise at least one of:

writing habits that characterize a writing style of an account owner;

composition habits that characterize non-stylistic compositional behaviors of an account owner; and interaction habits that characterize an interpersonal communication network of an account owner.

3. The method of claim 2, wherein:

the writing habits comprise at least one of:
 a frequency with which certain characters appear in messages sent by the account owner;
 a frequency with which certain words appear in messages sent by the account owner;
 grammatical features that appear in messages sent by the account owner; and
 stylistic features that appear in messages sent by the account owner;

the composition habits comprise at least one of:
 times of day the account owner sends messages;
 days of the week the account owner sends messages;
 web addresses included in messages sent by the account owner; and
 formatting features included in messages sent by the account owner; and the interaction habits comprise at least one of:
 recipients of messages sent by the account owner; and
 domains of messaging accounts of recipients of messages sent by the account owner.

4. The method of claim 1, wherein weighting the messaging behavior comprises:

determining that the messaging behavior typifies both the messaging account and the other messaging account; and assigning a weight to the messaging behavior for the messaging account that is higher than a weight assigned to the messaging behavior for the other messaging account.

5. The method of claim 1, wherein detecting the attempt by the user to send the message from the messaging account comprises intercepting the message before it is distributed to an intended recipient.

6. The method of claim 1, wherein determining, by comparing the features of the message with the weighted messaging behaviors associated with the messaging account in the behavior database, that the messaging account has potentially been compromised comprises determining that at least one of the features of the message does not match the weighted messaging behaviors associated with the messaging account in the behavior database.

7. The method of claim 1, wherein verifying that the user is the account owner comprises:

requiring the user to provide at least one of:
 an answer to a CAPTCHA;
 an answer to a security question previously chosen by the account owner; and
 an alphanumeric code sent to a mobile communication device linked to the account owner; and determining whether the user has been successfully verified.

8. The method of claim 7, wherein:

determining whether the user has been successfully verified comprises determining that the user has been successfully verified;

in response to the determination that the user has been successfully verified, determining that the messaging account has not been compromised; and in response to the determination that the account has not been compromised, updating the behavior database with the features of the message.

9. The method of claim 7, wherein:

determining whether the user has been successfully verified comprises determining that the user has not been successfully verified;

in response to the determination that the user has not been successfully verified, determining that the messaging account has been compromised; and in response to the determination that the messaging account has been compromised, preventing the user from accessing the messaging account.

10. The method of claim 1, wherein the computing device comprises at least one of:

at least one client-side computing device; and a server-side computing device.

11. A system for detecting compromised messaging accounts, the system comprising:

a maintenance module, stored in memory, that maintains a behavior database that associates messaging accounts of a plurality of users with messaging behaviors that typify each messaging account by:

extracting, from each of the messaging accounts, messaging features that describe stylistic and compositional traits of messages sent by the messaging accounts;

for each messaging account, identifying, based on the extracted messaging features, messaging behaviors that typify the messaging account by:
  determining a frequency with which the messaging account displays at least one messaging behavior;
  determining that the frequency with which the messaging account displays the messaging behavior exceeds a frequency with which at least one other messaging account displays the messaging behavior; and
  weighting the messaging behavior based on a comparison between the frequency with which the messaging account displays the messaging behavior and the frequency with which the other messaging account displays the messaging behavior;

identifying, based on the extracted messaging features, messaging behaviors that do not typify any of the messaging accounts of the plurality of users by identifying messaging behaviors that are displayed with a similar frequency by at least most of the messaging accounts of the plurality of users; and associating, in the behavior database, each of the messaging accounts of the plurality of users with the weighted messaging behaviors that typify each messaging account and not the messaging behaviors that do not typify any of the messaging accounts of the plurality of users;

a detection module, stored in memory, that detects an attempt by a user to send a message from one of the messaging accounts of the plurality of users;

a determination module, stored in memory, that determines, by comparing features of the message with the weighted messaging behaviors associated with the messaging account in the behavior database, that the messaging account has potentially been compromised;

a verification module, stored in memory, that verifies that the user is an owner of the messaging account in response to the determination that the messaging account has potentially been compromised; and at least one processor configured to execute the maintenance module, the detection module, the determination module, and the verification module.

12. The system of claim 11, wherein the messaging behaviors that typify each messaging account comprise at least one of:
writing habits that characterize a writing style of an account owner;
composition habits that characterize non-stylistic compositional behaviors of an account owner; and
interaction habits that characterize an interpersonal communication network of an account owner.

13. The system of claim 12, wherein:
the writing habits comprise at least one of:
a frequency with which certain characters appear in messages sent by the account owner;
a frequency with which certain words appear in messages sent by the account owner;
grammatical features that appear in messages sent by the account owner; and
stylistic features that appear in messages sent by the account owner;
the composition habits comprise at least one of:
times of day the account owner sends messages;
days of the week the account owner sends messages;
web addresses included in messages sent by the account owner; and
formatting features included in messages sent by the account owner; and
the interaction habits comprise at least one of:
recipients of messages sent by the account owner; and
domains of messaging accounts of recipients of messages sent by the account owner.

14. The system claim 11, wherein the maintenance module weights the messaging behavior by:
determining that the messaging behavior typifies both the messaging account and the other messaging account; and
assigning a weight to the messaging behavior for the messaging account that is higher than a weight assigned to the messaging behavior for the other messaging account.

15. The system of claim 11, wherein the detection module detects the attempt by the user to send the message from the messaging account by intercepting the message before it is distributed to an intended recipient.

16. The system of claim 11, wherein the determination module determines, by comparing the features of the message with the weighted messaging behaviors associated with the messaging account in the behavior database, that the messaging account has potentially been compromised by determining that at least one of the features of the message does not match the weighted messaging behaviors associated with the messaging account in the behavior database.

17. The system of claim 11, wherein the verification module verifies that the user is the account owner by:
requiring the user to provide at least one of:
an answer to a CAPTCHA;
an answer to a security question previously chosen by the account owner; and
an alphanumeric code sent to a mobile communication device linked to the account owner; and
determining whether the user has been successfully verified.

18. The system of claim 17, wherein:
the verification module determines whether the user has been successfully verified by determining that the user has been successfully verified;
the verification module further determines that the messaging account has not been compromised in response to the determination that the user has been successfully verified; and
the maintenance module updates the behavior database with the features of the message in response to the determination that the account has not been compromised.

19. The system of claim 17, wherein the verification module:
determines whether the user has been successfully verified by determining that the user has not been successfully verified;
in response to the determination that the user has not been successfully verified, determines that the messaging account has been compromised; and
in response to the determination that the messaging account has been compromised, prevents the user from accessing the messaging account.

20. A non-transitory computer-readable medium comprising one or more computer-executable instructions that, when executed by at least one processor a computing device, cause the computing device to:
maintain a behavior database that associates messaging accounts of a plurality of users with messaging behaviors that typify each messaging account by:
extracting, from each of the messaging accounts, messaging features that describe stylistic and compositional traits of messages sent by the messaging accounts;
for each messaging account, identifying, based on the extracted messaging features, messaging behaviors that typify the messaging account by:
determining a frequency with which the messaging account displays at least one messaging behavior;
determining that the frequency with which the messaging account displays the messaging behavior exceeds a frequency with which at least one other messaging account displays the messaging behavior; and
weighting the messaging behavior based on a comparison between the frequency with which the messaging account displays the messaging behavior and the frequency with which the other messaging account displays the messaging behavior;
identifying, based on the extracted messaging features, messaging behaviors that do not typify any of the messaging accounts of the plurality of users by identifying messaging behaviors that are displayed with a similar frequency by at least most of the messaging accounts of the plurality of users; and associating, in the behavior database, each of the messaging accounts of the plurality of users with the weighted messaging behaviors that typify each messaging account and not the messaging behaviors that do not typify any of the messaging accounts of the plurality of users;

detect an attempt by a user to send a message from one of the messaging accounts of the plurality of users;

determine, by comparing features of the message with the weighted messaging behaviors associated with the messaging account in the behavior database, that the messaging account has potentially been compromised; and in response to the determination that the messaging account has potentially been compromised, verify that the user is an owner of the messaging account.

* * * * *